(12) United States Patent
Potter

(10) Patent No.: US 8,550,034 B2
(45) Date of Patent: *Oct. 8, 2013

(54) POULTRY COOP

(75) Inventor: Cheryl Potter, Santa Cruz, CA (US)

(73) Assignee: Black Hen Farm, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,049

(22) Filed: Jun. 29, 2012

(65) Prior Publication Data

US 2012/0279455 A1 Nov. 8, 2012

Related U.S. Application Data

(63) Continuation of application No. 12/020,480, filed on Jan. 25, 2008, now Pat. No. 8,230,817.

(60) Provisional application No. 60/886,607, filed on Jan. 25, 2007.

(51) Int. Cl.
 *A01K 31/18* (2006.01)
(52) U.S. Cl.
 USPC .......................................... 119/487
(58) Field of Classification Search
 USPC .................. 119/493–495, 482, 487, 531, 533
 See application file for complete search history.

(56) References Cited

U.S. PATENT DOCUMENTS

| | | | | |
|---|---|---|---|---|
| 506,831 A * | 10/1893 | Ridings | ........................ | 119/487 |
| 894,765 A * | 7/1908 | Weeks | ........................ | 119/494 |
| 1,109,477 A * | 9/1914 | Spanke | ........................ | 119/487 |
| 1,127,712 A * | 2/1915 | Wrenn | ........................ | 119/437 |
| 1,159,323 A * | 11/1915 | Maltby | ........................ | 119/487 |
| 1,218,259 A | 3/1917 | Hellwig | | |
| 1,367,416 A * | 2/1921 | Meszaros | ........................ | 119/487 |
| 1,455,105 A | 5/1923 | Butcher | | |
| 1,552,288 A * | 9/1925 | Ford | ........................ | 119/487 |
| 1,581,082 A | 4/1926 | Clarke | | |
| 4,788,934 A | 12/1988 | Fetter | | |
| 5,147,481 A | 9/1992 | Deblander | | |
| 5,417,017 A * | 5/1995 | Toutountzis | ........................ | 52/101 |

* cited by examiner

*Primary Examiner* — Rob Swiatek
*Assistant Examiner* — Ebony Evans
(74) *Attorney, Agent, or Firm* — Orrick, Herrington & Sutcliffe LLP

(57) ABSTRACT

An improved poultry coop that facilitates the prevention of entry of predators and the transmission of pathogens to and between the housed birds. In a preferred embodiment, the coop, which advantageously meets bird flu guidelines, includes an insulated house, a covered run coupled to the house, and a covered feed house. All openings are preferably covered with ½" hardware cloth or mesh wire. the same cloth or mesh wire is preferably buried beneath the earth below the coop and coupled to the coop.

20 Claims, 2 Drawing Sheets

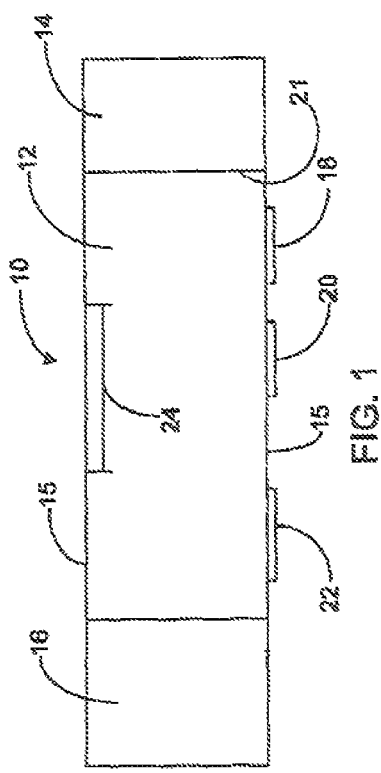
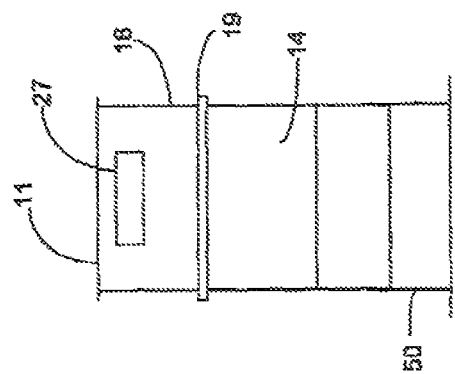
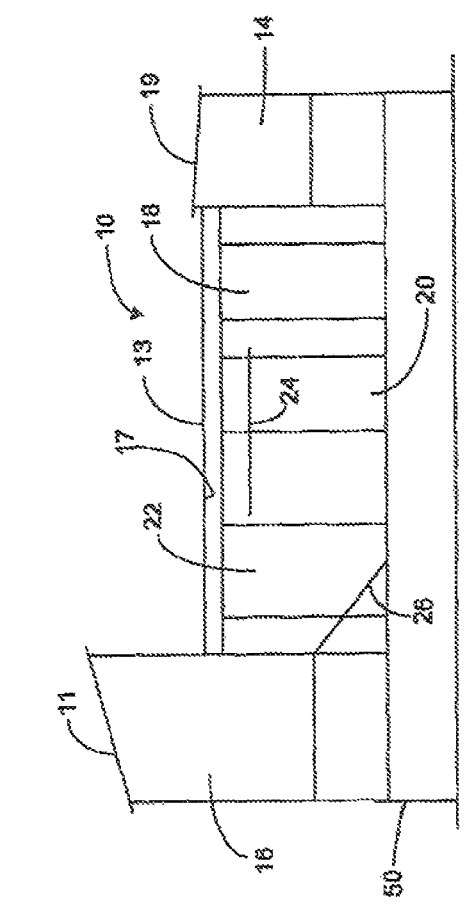

POULTRY COOP

CROSS-REFERENCE TO RELATED APPLICATION

This application is a continuation of U.S. application Ser. No. 12/020,480 filed Jan. 25, 2008 now U.S. Pat. No. 8,230, 817, which claims the benefit of U.S. provisional application Ser. No. 60/886,607, filed Jan. 25, 2007, which application is fully incorporated herein by reference.

FIELD OF THE INVENTION

The present invention relates to poultry coops and, more particularly, to a poultry coop that facilitates a stress reduced environment for the housed birds and the prevention of entry of predators and the transmission of pathogens to and between the housed birds.

BACKGROUND

Poultry coops are used to house chickens and other poultry and typically include a house and a run area that is uncovered. As a result, the housed birds are susceptible to the transmission of pathogens or disease from wild bird transmitted from direct contact with the wild birds or from the feces of wild birds dropping into the run area of the coop. In addition to disease, the housed birds are susceptible to predators in conventional coops.

Thus, it is desirable to have a coop that facilitates a stress reduced environment for the housed birds and the prevention of entry of predators and the transmission of pathogens to and between the housed birds.

SUMMARY

The embodiments described herein are directed to an improved poultry coop that facilitates the prevention of entry of predators and the transmission of pathogens to and between the housed birds. In a preferred embodiment, the coop, which advantageously meets bird flu guidelines, includes an insulated house, a covered run coupled to the house, and a covered feed house. All openings are preferably covered with ½" hardware cloth or mesh wire. the same cloth or mesh wire is preferably buried beneath the earth below the coop and coupled to the coop.

The poultry coop advantageously prevents contagious disease, protects from predators, provides space to raise chicks, keeps food and birds dry, prevents fighting, allows quick cleaning, and stays cooler in the summer and warmer in the winter.

Further features and advantages of the present invention will become apparent to those of skill in the art in view of the detailed description of preferred embodiments which follows, when considered together with the attached drawings and claims.

BRIEF DESCRIPTION OF THE DRAWINGS

FIG. 1 is a top view of a preferred embodiment of a poultry coop.
FIG. 2 is a side view of the poultry coop.
FIG. 3 is a end view of the poultry coop viewed from the feed house end of the coop.

DETAILED DESCRIPTION

Figure 6:
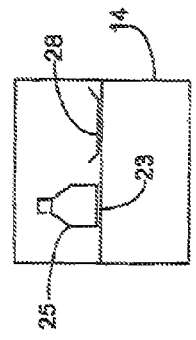
FIG. 6 is a front view of the feed house.
Figure 8:
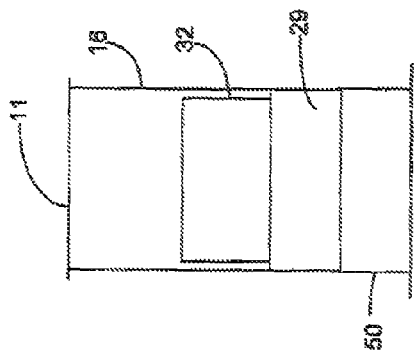
FIG. 8 is a rear view of the house.

The embodiments described herein are directed to an improved poultry coop that facilitates the prevention of entry of predators and the transmission of pathogens to and between the housed birds. In a preferred embodiment, The coop 10 is made of a run area 12, a feed area 14, and a house area 16. It can be sized to accommodate any number of birds, for example, at least 10 square feet per standard-size chicken in the run area 12, and at least 2 square feet in the house 16. For an embodiment that houses six standard size chickens: one rooster and five hens, the entire structure has a footprint of about 20 feet by 4 feet (internal dimensions).

The run 12 includes a frame that in an example is about 4 feet wide by 15 feet long, and 4 feet tall (internal dimensions). It has a solid top 13, either opaque roofing material or clear material that lets light shine in, such as SUNTUF panels. The gap between the top and the feeding area and house area is sealed with metal flashing. The sides 15 and top 17 (under the roofing material) are covered with ½ inch hardware cloth, which is attached to a rot-resistant wood frame, here redwood, with U-shaped nails. 1 inch by ½ inch wire could also be used. The run can be topped by an arbor with deciduous vines, or deciduous trees or other plants can be planted on the side(s), to shade the structure during hot summer months. Because chicken ancestors originated in rainforests, the canopy also makes the chickens feel secure and safe from predators, particularly flying predators.

One side of the run has two removable doors 18, 20 and one easy-access swing out door 22. The former has hinges and a latch and is useful for accessing the run for daily maintenance. The other two doors 18, 20 are useful for removing and replacing bedding in the run. They have brackets on the sides that hold the door 18, 20 onto the frame, and two slide bolts on the opposite side that locks them in place. They need to fit snugly so there are no holes bigger than a dime, which would allow rodents access.

There is a roost 24 attached to the opposite side of the frame from the doors 18, 20, 22 in the middle of the run 12. It can be used by hens to get away from the rooster, or for those lower in the pecking order to get away from those higher in the pecking order, avoiding conflict and injury.

For birds who fly well, such as smaller chickens and game chickens, the run 12 can be taller. More roosts 24 at various heights can be installed on the sides, and a swing can be installed in the middle. If the height is walk-in tall, the side clean-out doors 18, 20 are unnecessary.

It is best to keep the run 12 on flat land, since chickens will push bedding downhill. Although, you can create steps to prevent this process from happening as quickly, or cut into the hill so the coop 10 is perpendicular to the slope and perhaps have one side of the coop 10 serves as a partial retaining wall, but care should be taken to insure that the coop does not slide down the hill or become the victim of a snow avalanche.

The top 13 of the run 12 needs to be sloped. In areas that do not receive snow, the top 13 can be sloped slightly so water runs off the roof, and there needs to be enough overhang of roofing material to minimize splashing back into the run. In areas of snow, the roof needs to be slanted more, as recommended for the area, and it needs strong framing to support the load.

Because the coop 10 rests directly on the ground, which poultry like chickens vastly prefer for scratching and dust bathing, the coop 10 should not be placed in areas that flood or have poor drainage. If drainage is a problem, it needs to be solved before the coop 10 is placed there. For example, French drains can direct water away from an area. Wet, smelly mud and puddles, which they will drink out of, are bad for poultry health.

The feed area 14 is a wood box with a slanted roof 19 so rainwater flows away from the run 12. It is about 2 feet long by 4 feet wide (internal dimensions). It can be the same height as the run 12, or for taller runs, a smaller height, such as 4 feet tall. One end 21 is open to the run, and the other has a swing out door for easy access while feeding. There is a platform 23 where the poultry keeper can set the waterer 25 and feeders 28; alternatively, the equipment could be attached to the sides, or suspended from the top. The platform 23 is placed high enough off the ground that the birds can jump onto it, but not throw bedding and dirt onto it. There are two or more small drainage holes so that water does not pool on the platform. There needs to be adequate framing under the platform so it does not sag.

Figure 4:
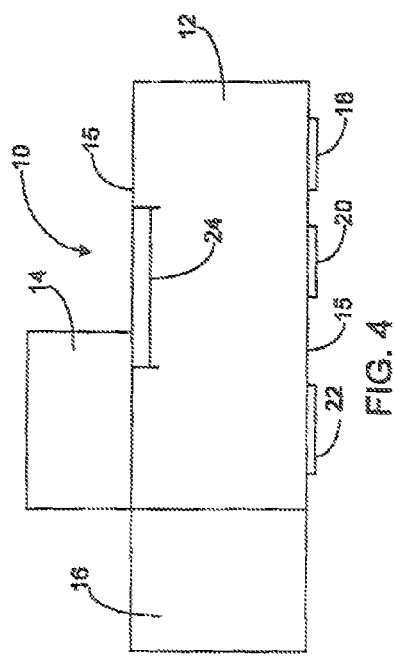
FIG. 4 is a top view of an alternative embodiment of the poultry coop.
Figure 7:
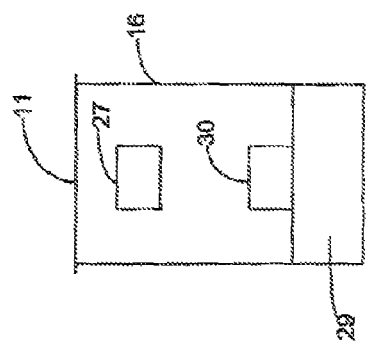
FIG. 7 is a front view of the house.
Figure 5:
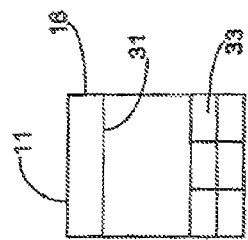
FIG. 5 is a top view of a house of the poultry coop.

On flat land, the feed area 14 can be placed at the end of the run 12, opposite the house 16. On sloped land, the feed area 14 is best placed adjacent to the house 16, on the side that is opposite the doors 18, 20 of the run 12, with the house 16 on the high ground. (See FIG. 4.) This prevents bedding from accumulating in the feed area 14 and soiling the water and food, and creating a mess to clean up.

Dry feed and clean water prevent disease. Further, shaded water means that algae and slime will not grow as fast in warm weather. (In freezing temperatures, a water heating device can be used.) Ideally, the open end 21 of the feeding area 14 is placed in the opposite the direction of low winter sun; in California, ideally facing north. Further, if possible, place it in a direction where stormy winds will not blow water into the feed area. For example, if wet winter storms blow from the west, place the open end of the feed area in a direction other than west.

The house 16 is insulated on the top 11 and sides 15, for example, double-wall construction with insulation between, or structural panels that already contain insulation. The degree of insulation depends on what is recommended for the climate. The insulation keeps the house 16 warmer in the winter, preventing frostbite, plus warmer temperatures keep the birds healthier; it keeps the house 16 cooler in the summer, preventing heat stress and even death. It also muffles the sound when hens lay eggs or roosters crow at night. The roof 11 slants away from the run so water and snow fall away from it. In this example, the internal dimensions of the house 16 are 4 feet by 3 feet. There should be an overhang to prevent water from entering the run 12 or the house 16.

The house 16 is raised off the ground creating an area 29 under it that the birds can go when it is particularly windy to stay warm, or very hot to stay cool. The sides of the area under the house 16 are covered by rot-resistant wood planks, here redwood, and the area is open to the run. The area is about 2 feet tall. This area can be a life-saver during hot temperatures, and much more comfortable during wet and windy storms. (Poultry frequently perish during heat waves.) During the day, poultry do not usually like to spend time in their house 16 but prefer to be outdoors.

The side of the house 16 facing the run has a door 30 for the birds and a removable ramp 26. A wood rectangular open frame attaches to the house 16, and the ramp 26 has either a metal or wood lip that inserts into the frame to hold it in place. The ramp 26 has cross-pieces of wood so the birds do not slide down it, but no sharp objects protruding above or below it that can cause injury. It's important to place the ramp 26 so that it does not impede closing the door 30 above it.

The door 30 has a slide bolt so the keeper can lock the birds up at night, and hook on the outside so it does not blow shut during the day. Although locking birds up at night is not necessary since the run is predator-proof, it is useful as another level of precaution, to keep roosters from crowing too loudly early in the morning (since the house 16 is insulated, it muffles the sound), or to keep a hen with chicks inside the house away from the other adults.

Above the door 30 toward the top is a small window 27. The opening is covered from the inside with ½" hardware cloth to keep out predators. The window 27 lets light into the house 16 so the birds can navigate within it, such as to jump on roosts or lay eggs. The window 27 can be open during warm weather and closed during cold weather. It is held shut with a slide bolt; held open with a small chain attached to a hook. The window 27 can be as simple as plexiglass screwed to a basic wood frame and is about 10 inches by 6 inches. Not having adequate light in the house 16 could mean that the birds could hurt themselves or not want to go inside. Chickens can break their necks by jumping wrong off of a roost 31.

The sides next to the front have cross-ventilation holes. In the sample, there are three holes with metal roof ventilation inserts on each side. Cross-ventilation is important to remove moisture and ammonia from the air, which can cause health problems. But drafts must be avoided so the holes are placed at the very top away from where the birds are roosting.

The access door 32 that the keeper uses can be located on a side or the back. The advantage to having it on the side is that rain runoff does not fall on the keeper from the roof. It is a wide swing-out door with a latch that is a little less wide than the side, leaving room for hardware, and about 1.5 feet tall. There should be no lip on the bottom so that the keeper can use the door 32 to quickly sweep out the bedding into a container.

There are two roosts in the house, one fixed and one attached to the nest box 33. The nest box 33 is placed on one of the sides. If the door 32 is in the back of the house, the keeper can reach in and collect eggs from the side; if the door 32 is on the side, the nest box 33 should be located on the same side for easy egg access.

The fixed roost 31 is a somewhat straight hardwood branch about 1.5 inches thick. Screws attached from the outside hold it in place, with extra support from a small wood piece under it attached on the inside. The roost 31 is placed high enough that it does not interfere with cleaning, but low enough that it does not cause a draft directly on the birds from the ventilation holes. It should be at least 6 inches from the side, to prevent feces from sticking to the side.

The nest box 33 has three compartments in this example. Each nest box compartment should be about 1 foot square; there should be at least one nest box 33 per five hens. It has an open bottom for ease of cleaning and rests directly on the floor. They are divided by two pieces of plywood, there are two small strips in the front and back to keep bedding inside and keep eggs from rolling out. On top of the compartments is a piece of sturdy plywood resting on the dividers. Supports hold a roost over this plywood; this roost also serves as a handle for the nest box. To prevent it from tipping, there is a small piece of wood attached to the front and back of the house at the height of the top platform. To remove it, lift the nest box up by the handle to clear the small wood pieces, and slide forward. There should be at least 6 inches of roost space per chicken; in this example, they get at least 1 foot, which is ample space for all birds to roost comfortably. Some birds like to roost in the run on that roost, but usually come inside when it gets cold. If they do not, the keeper should move them inside, unless there are serious personality issues between the birds, in which case it is best to move some of the birds to a different coop.

An alternate design is to have a slanted floor on the nest box that causes eggs to roll into a compartment. Some people use this design for birds who eat their eggs. However, usually an egg-eating problem is a result of poor nutrition, lack of food at all times, hens vying for nest box space, or inadequate calcium or vitamin D or infection causing thin egg shells, so this design is not usually needed. Also, the nest box is adequately dark in this design, which also can be a factor in preventing hens from eating eggs.

The entire structure has ½" hardware cloth or 1 inch by ½" wire 50 dug in underneath. This is to prevent predators from digging in and also to keep rodents from getting in or living under the structure. The most secure way is to dig out the entire footprint of the structure at least 2 feet and install the wire underneath and on the underground sides. On flat land, just the sides could be dug out, with 6 inches of the wire jutting out horizontally on the bottom. If there is sloped land nearby, sometimes rodents will dig in lower, so it is best that the entire footprint be dug out. It is not recommended that the wire be dug in more shallowly, as rodents could live under the structure or burrow in, and predators could dig in.

There should be no gaps in the wire more than a dime in size, to prevent rodents from slipping through. All pieces should be securely attached together with hog clips or cage clips. The wire attaches to the wood frame with U-shaped nails. There should be no wire jutting into the area that could injure the birds' feet.

The following features of the structure prevent the birds from contracting contagious diseases, such as bird flu. These features were based on information gathered from guidelines published by UK DEFRA and UC Davis, and interviewing poultry veterinarians.

The top is solid to prevent wild bird feces from falling from above.

The construction, including the wire sides, prevents wild birds from getting into the structure.

Rodents cannot get into the structure.

Food and water are kept clean in the feed area, and the water is sheltered from sun to prevent pathogens from growing in the water.

With these features, the coop could possibly be used as a quarantine structure during a disease outbreak in the area. Sometimes double-wire sides are required during outbreaks; in that case, a temporary fence could be installed inside the run.

The units have been tested in an area where there is a high concentration of bobcats, coyotes, foxes, raccoons, opossums, skunks, and probably mountain lions, and they have never gained access. Slide bolts and hooks with sleeves are important if dexterous predators such as raccoons are present.

The unit was also tested using two 130-pound dogs, Labrador retriever mixes. They are extremely strong and willful dogs who have destroyed redwood decks and fencing, chain link fence, and welded wire fencing. To test whether they could enter the structure, their favorite bread was placed inside and they attempted to get in to eat it. Although they tried persistently, they could not get into the structure.

If an area has other predators such as bears, it is recommended that the keepers take additional precautions, such as installing electric wire or fencing designed to deter bears.

The structure also keeps out smaller creatures, such as rodents, if care is taken to not have gaps in the wire any more than a dime. For the unit to be predator-proof, the wire also needs to be attached to the wood frame using U-shaped nails spaced closely together. A staple gun is not adequate.

When raising chicks in a flock situation, several challenges occur:

Other hens continually lay eggs in the same nest box as the sitting hen, so that eggs at different stages of development are present, or resulting in broken eggs, since the hen is reluctant to leave and a few hens might end up using the same space. After a certain number of chicks hatch, the hen usually leaves the nest, so the rest of the embryos either die or must be moved by the keeper to an incubator.

Rodents or other hens can eat the eggs, killing the fetuses.

During or after hatch, other hens or a rooster may kill the chicks.

This coop is rodent-proof, so rodents tend not to be a problem. In addition, one or more sitting hens can be locked in the house to hatch out the chicks and raise them to a size where they can be released into the flock to mature. During this time, birds outside the coop can roost on the outdoor roost, and a temporary nest box can be placed under the house for laying eggs. Because hens usually hatch eggs when the weather is warmer, the other birds should be comfortable. The light from the window illuminates the space within enough that the hens and chicks can see.

For poultry health, it's important that the food remain dry and that they do not drink out of muddy puddles containing fecal matter or slosh around in mud. *Aspergillus* is one of the dangerous molds that can grow in wet feed, and can cause lung fungal infections that kill birds. Wet conditions can chill birds and make it more likely that they will become ill.

Because the top of the entire coop is covered, it stays pretty dry inside. There are also sheltered areas where the birds can go during high winds. The longer the roof overhang, the drier the inside will stay because it prevents splashing.

The run should be filled with thick bedding such as pine wood shavings, rice hulls, or both, using the deep litter method. The bedding can be removed periodically and composted for the garden. Cedar chips should not be used, as they are toxic to birds, and straw grows dangerous mold quickly and mats badly, making it difficult to work with. Birds can get impacted crops if they eat straw.

Poultry have a distinct pecking order and some males can be aggressive at times. To prevent birds from hurting each other, there is a roost in the run area where they can get away. There are also two roosts in the house area, so birds who do not like each other can stay away from each other. If recommended space guidelines are followed for non-commercial free-range flocks, there should not be serious fighting. However, the birds must not be overcrowded and males who do not get along, or who over-mate the hens in competition, should not be kept together. In the example, there is one rooster per five hens, which has worked well in the tests.

The house and top of the nest box should be covered well with bedding such as pine shavings and rice hulls, and more can be added quickly through the keeper's door. It can be cleaned in less than five minutes by removing the nest box and simply sweeping the bedding into a container through the cleanout door. Because it is so easy to clean the house, it encourages the keeper to do it more often and results in birds with better health.

Clean nest boxes are important for preventing peritonitis and to have clean eggs without breaks.

A clean house prevents the buildup of harmful pathogens, parasites, and ammonia.

The house is insulated, so it stays cooler in the summer and warmer in the winter.

The structure has excellent air flow due to the open sides in the run and the ventilation holes in the house. For additional cooling in very hot climates, a mist system could be installed under the run roof.

During the day, during windy conditions or to get cooler, birds can go to the sheltered area under the house, which stays significantly cooler.

The house has a window that can be open or shut depending on the weather. The window opens upward to prevent rain from entering the structure. Opening the window helps hot air escape.

Growing deciduous vines over the run, or planting deciduous trees next to it provides needed shade during hot summers. It also fertilizes the plants and the chickens control insect pests, so it's a beneficial relationship for both plants and birds.

During cold temperatures, the house window can be shut. During freezing temperatures, the keeper can install a device to keep the water from freezing, and a simple heating device in the house, such as a plastic heating pad or clip-on light with a not-energy-efficient light bulb, careful that it does not touch anything flammable. A small hole that can be plugged when not in use can allow an electric cord to pass through.

These embodiments are meant to be illustrative examples and not exhaustive of the types of useful acoustic devices that can be built by patterning membranes or movable structures over cavities that are within a laminate or lead frame structure, nor of the methods of manufacturing said devices.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

The invention claimed is:

1. A poultry coop comprising:
    a house;
    at least one nest box;
    a roost;
    a run coupled to the house, and
    a feed house coupled to the run, wherein the house, nest box and feed house having sides and tops, and bottoms open to a surface of the ground upon which the coop is positioned;
    wherein the roost is attached over the top of the at least one nest box and comprises a handle for the nest box; and
    wherein the at least one nest box is removable for cleaning.

2. The coop of claim 1, wherein the house has an access door located on one of the sides of the house; wherein the access door and at least one nest box are located on the same side of the house.

3. The coop of claim 1, wherein the at least one nest box comprises compartments.

4. The coop of claim 3, wherein at least one nest box comprises three compartments.

5. The coop of claim 3, wherein the compartments have a dimension of 1 foot square.

6. The coop of claim 1, further comprising an additional nest box.

7. The coop of claim 1, wherein the at least one nest box and the roost are comprised within the house.

8. The coop of claim 1 further comprising a predator prevention cover secured over all openings in the sides and tops of the run, house and feed house that are open to the exterior of the coop, the predator prevention covet having a plurality of holes wherein the diameter of each hole being no greater than ½ inch; and
    a predator prevention under cover having a plurality of holes and being secured to the sides of the house, run and feed house adjacent the bottoms of the house, run and feed house and extending in a first direction from around the periphery of the house, run and feed house downwardly away from the house, run and feed house below the surface of the ground upon which the coop is positioned and in a second direction inwardly under the house, run and feed house below the surface upon which the coop is positioned and in spaced relation to the house, run and feed house.

9. The coop of claim 8, wherein the predator prevention cover and under cover is a ½ inch hardware cloth.

10. The coop of claim 8 wherein the predator prevention under cover further extending in a third direction co-extensive with the second direction and outwardly away from the house, run and feed house below the surface of the ground upon which the coop is positioned.

11. The coop of claim 1, wherein the house is insulated.

12. A poultry coop comprising:
    a house comprising a nest box;
    a run coupled to the house,
    a feed house coupled to the run, wherein the house, nest box, run and feed house having sides and tops, and bottoms open to a surface of the ground upon which the coop is positioned,
    a predator prevention cover secured over all openings in the sides and tops of the run, house and feed house that are open to the exterior of the coop, the predator prevention cover having a plurality of holes wherein the diameter of each hole being no greater than ½ inch;
    a predator prevention wider cover having a plurality of holes and being secured to the sides of the house, run and feed house adjacent the bottoms of the house, run and feed house and extending in a first direction from around the periphery of the house, run and feed house downwardly away from the house, run and feed house below the surface of the ground upon which the coop is positioned and in a second direction inwardly under the house, run and feed house below the surface upon which the coop is positioned and in spaced relation to the house, run and feed house; and
    wherein the nest box is removable for cleaning.

13. The coop of claim 12, wherein the house has an access door located on one of the sides of the house; wherein the access door and nest box are located on the same side of the house.

14. The coop of claim 12, wherein the house further comprises at least one roost.

15. The coop of claim 14, wherein the at least one roost is attached to the nest box.

16. The coop of claim 14, wherein the at least one roost is attached over the top of the nest box.

17. The coop of claim 16, wherein the at least one roost comprises a handle for the nest box.

18. The coop of claim 12, wherein the nest box comprises compartments.

19. The coop of claim 12, wherein the house and the nest box is covered by bedding.

20. The coop of claim 12, wherein the coop has at least one nest box for every five chickens housed in the coop.

* * * * *